United States Patent [19]

Hautekeer et al.

[11] Patent Number: 5,425,947
[45] Date of Patent: Jun. 20, 1995

[54] CURABLE FILLED POLYSILOXANE COMPOSITIONS

[75] Inventors: Jean-Paul Hautekeer, Ans; Patrick Leempoel, Brussels, both of Belgium

[73] Assignee: Dow Corning S. A., Seneffe, Belgium

[21] Appl. No.: 978,560

[22] Filed: Nov. 19, 1992

[30] Foreign Application Priority Data

Nov. 22, 1991 [GB] United Kingdom ............... 9124833

[51] Int. Cl.⁶ .................... C08K 5/54; C08L 83/00
[52] U.S. Cl. ................... 524/267; 524/425; 524/506; 524/854; 524/188; 524/731; 525/103
[58] Field of Search ............... 524/506, 425, 267, 854, 524/788, 731; 525/103

[56] References Cited

U.S. PATENT DOCUMENTS

| | | | |
|---|---|---|---|
| 3,770,687 | 11/1973 | Mestetsky | 260/30.45 B |
| 3,943,085 | 3/1976 | Kraft et al. | 524/506 |
| 4,251,616 | 2/1981 | Hendriks | 430/107 |
| 4,393,161 | 7/1983 | Van Abeelen et al. | 524/506 |
| 4,395,524 | 7/1983 | Emmons et al. | 524/555 |
| 4,785,039 | 11/1988 | Algrim et al. | 524/506 |
| 4,808,251 | 2/1989 | Ghosh et al. | 149/2 |
| 4,867,896 | 9/1989 | Elliot et al. | 252/94 |
| 4,898,910 | 2/1990 | Kamis et al. | 524/860 |
| 4,925,890 | 5/1990 | Leung et al. | 524/506 |
| 4,962,152 | 10/1990 | Leempoel | 524/788 |
| 4,987,170 | 1/1991 | Ishida et al. | 524/267 |
| 5,063,114 | 11/1991 | Nambu et al. | 525/103 |
| 5,104,925 | 4/1992 | Honda et al. | 524/517 |
| 5,132,350 | 7/1992 | Keogh | 524/506 |
| 5,200,461 | 4/1993 | Tsuchiya et al. | 523/103 |
| 5,202,190 | 4/1993 | Kantner et al. | 525/103 |

FOREIGN PATENT DOCUMENTS

80108458 5/1980 Japan.

OTHER PUBLICATIONS

European Search Report, for EP 92 31 0475, dated 3 Mar. 93.

*Primary Examiner*—Melvyn I. Marquis
*Assistant Examiner*—Karen A. Dean
*Attorney, Agent, or Firm*—Roger H. Borrousch

[57] ABSTRACT

The specification describes and claims a moisture curable composition comprising hydroxypolysiloxane, silane curing agent, finely divided filler (preferably calcium carbonate), catalyst, and as rheological additive, a polymer having on its polymer chain at least one carboxylic acid anhydride group. Preferred rheological additives are polybutadiene polymers treated with e.g. maleic acid anhydride. These products have improved rheology for sealant use.

10 Claims, No Drawings

CURABLE FILLED POLYSILOXANE COMPOSITIONS

This invention is concerned with improvements in or relating to curable, filled polysiloxane compositions.

Curable polysiloxane compositions find use in various applications for example, as sealant compositions which can be applied to a joint between elements and cured to provide an elastomeric seal between them. Those compositions which cure at room temperature upon exposure to atmospheric moisture are particularly attractive for use as sealant compositions for sealing for example, highway joints, joints in articles for example vehicle headlights and joints in glazing applications, in view of the fact that no special heating or other cure conditions are generally required to produce a seal of desired quality.

Compositions intended for use as sealant compositions are required to have a combination of properties. For example they should be capable of curing at an acceptable rate at ambient or elevated temperatures to provide a cured mass at least lightly adherent to the surfaces of the joint, which mass has desired elastomeric properties as evidenced by modulus at 100% elongation, elongation at break and tensile strength. The effectiveness of the seal in its chosen location is principally dependent on its elastomeric properties and the good adherence of the seal to the surfaces of the joint. Elastomeric properties and the adhesion performance of the seal are governed at least in part by the formulation of the sealant composition and are influenced by the type and proportion of the elastomer and filler which are used. Filler materials frequently employed in room temperature curable silicone sealants include the so-called reinforcing fillers, which are generally of a small particle size for example precipitated and fumed silicas, and the so-called non-reinforcing fillers, for example, clays, ground glass, quartz and the ground oxides, hydroxides, carbonates and bicarbonates of for example calcium, magnesium barium or zinc produced by grinding or precipitation techniques. The carbonates may be surface treated, for example, stearate coated, or not. Of these materials, the silicas are commonly used in practice. The calcium carbonates are also used, the surface treated materials being preferred. It has been found that adhesion of the composition to certain substrates is influenced by the filler selected for use in the composition.

In European Patent Specification E.P. 384 609 there is described and claimed a curable composition comprising (A) the product formed by mixing 100 parts by weight of a hydroxypolysiloxane with from 5 to 12 parts by weight of a curing agent therefore comprising a silane of the formula $R_aR'_bSi$ or a siloxane having units

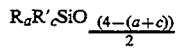

wherein each R represents a monovalent hydrocarbon group, each R' represents an hydroxy, alkoxy, or alkoxyalkoxy group, $a+b=4$, a has a value 0 or 1, b has a value 3 or 4, c has a value 1, 2 or 3 and $a+c$ is not greater than 3, (B) from 50 to 200 parts by weight of a filler comprising a mixture of 10 to 80% by weight of the mixture of a calcium carbonate composed principally of particles having a surface area from 10 $m^2$/g and 20 to 90% by weight of the mixture of a calcium carbonate composed principally of particles having a surface area from 0.5 $m^2$/g to 12 $m^2$/g and (C) a catalytic amount of a titanium or tin compound for promoting curing of the product in presence of moisture of the atmosphere.

Compositions as described and claimed in E.P. 384 609 demonstrate a desirable blend of elastomeric and adhesive properties. However, we have found that some compositions as described therein and which when cured have modulus characteristics desirable for sealants tend prior to cure, to flow more readily than is desirable for sealants intended for application to vertically extending joints. For example, when large proportions of non-reinforcing filler are employed, the compositions tend to flow readily and sometimes uncontrollably when extruded and continue to flow until cure thus rendering them less suitable for use as sealants for vertical joints. Increasing the proportion of reinforcing filler to compensate some of the effect on rheology results in increase in the modulus of the cured sealant. When sufficient proportions of strongly reinforcing fillers are present to bring about desirable flow characteristics, for example using fumed silica, (which should be used in comparatively small proportions) or precipitated calcium carbonate (which should be used in much larger quantity to achieve the same rheology as with silica) tends to lead to cured sealants with a modulus at 100% elongation which is higher than desired for many sealant applications.

In the art of silicone sealants it is known to employ plasticisers, for example non-reactive silicone fluids or gums, for example trialkylsilyl polydiorganosiloxanes, or organic diluents, for example aromatic petroleum hydrocarbons e.g. petroleum naphtha or a polyether, to reduce the modulus of the cured composition. However, presence of larger proportions of plasticiser to reduce the modulus leads to increased flow of the composition and thus a deterioration of the rheology.

It has also been proposed to incorporate into silicone based sealant compositions salts of sulphonic acids of the formula $RSO_3H$ in which R represents a hydrocarbon group which may be halogenated or not and may consist of or comprise an aliphatic chain of up to about 20 carbon atoms, for example alkyl or alkylaryl sulphonic acids, for example dodecylbenzene sulphonic acid (DBSA) as modulus lowering additives. These additives have a major effect on modulus, but alone, they have a very limited effect on rheology with respect to the flow characteristics required.

Surprisingly it has been found that one may provide a calcium carbonate-filled silicone based composition having not only excellent modulus and adhesion characteristics but also desirable flow properties in terms of extrusion of the composition at an acceptable rate to flow into contact with surfaces of the joint and to resist slump and to resist deformation during cure of the composition by incorporation in the composition of certain polymers having at least one carboxylic acid anhydride group in or on the polymer chain.

The present invention provides in one of its aspects a curable composition comprising the product formed by mixing a hydroxypolysiloxane with a silane or siloxane curing agent therefor, finely divided filler, a catalyst for promoting curing of the product in presence of moisture of the atmosphere and a rheological additive comprising a polymer having in or on its polymer chain at least one carboxylic acid anhydride group.

Hydroxypolysiloxane materials for use in a composition according to the invention may be linear or branched and may have a functionality of two or more. The polymer may include branching units according to the formula $$R_aSiO_{\frac{(4-a)}{2}}$$

wherein R is as aforesaid and a has a value of 0 or 1. α-w dihydroxy polysiloxanes are most preferred and these may be represented by the general formula HO(R$_2$SiO)$_x$H wherein each R represents a monovalent hydrocarbon group, for example an alkyl group having up to twelve carbon atoms (e.g. methyl, ethyl, propyl, vinyl or allyl) or an aromatic group (e.g. phenyl). Preferred materials are hydroxy terminated polydiorganosiloxanes of the formula HO(R$_2$SiO)$_x$H wherein x is an integer which may be for example, such that the polymer has a viscosity in the range 50 to 500,000, more preferably 10,000 to 100,000 mm$^2$/s at 25° C. The preferred hydroxypolysiloxanes may be made by procedures well-known in the art. Usually they are made by the addition of diorganodi-chlorosilanes to a water/solvent mixture to yield a mixture of low molecular weight hydroxy end-blocked oligomers and cyclic siloxanes in solvent. Linear α-w dihydroxy polysiloxane polymers of desired molecular weight may be manufactured from the low molecular weight linear dihydroxy polydiorganosiloxane oligomers, (produced as aforesaid or by a process involving ring opening of the cyclic materials referred to) by way of condensation and equilibration in the presence of a basic or an acidic catalyst. In preferred materials at least 85% and preferably all of the R groups are methyl.

The hydroxypolysiloxane polymers may be formulated into a curable composition by admixture with a silane or siloxane curing agent. In a composition according to the present invention the curing agent may be a silane of the formula R$_b$R'$_c$Si or a siloxane having units $$R_aR'_dSiO_{\frac{(4-(a+d))}{2}}$$

wherein each R represents a monovalent hydrocarbon group, each R' represents an hydroxy, alkoxy, alkoxyalkoxy group, alkenyl alkoxy or oximo, b+c=4, b has a value 0 or 1, c has a value 3 or 4, d has a value 1, 2 or 3 and a+d is not greater than 3 to form a mixture and/or a reaction product of the hydroxypolysiloxane with a compound containing not less than three silicon-bonded groups which are reactive with or become reactive with (e.g. under influence of atmospheric moisture) the silicon-bonded hydroxyl groups of the polysiloxane. Curing agents which may be used for example, include the known tri-functional and tetrafunctional moisture vapour activated crosslinkers which employ alkoxy, alkoxyalkoxy or oximo substituted silanes (as exemplified by methyltrimethoxy silane, phenyltrimethoxysilane, methyltris(methylethylketoximino)silane and methoxymethylbis(methylethylketoximino)silane).

A composition according to the invention may also comprise a polydiorganosiloxane according to the general formula $$R^1(R_2SiO)_x\overset{\overset{R}{|}}{\underset{\underset{R}{|}}{Si}}{-}R^1$$

wherein R and x are as aforesaid and R$^1$ is a group $$-(CH_2)_n\overset{\overset{R_m}{|}}{Si}-(OR'')_{3-m}$$

wherein n has a value 2 or 3, m has the value 0 or 1, such as referred to, for example in U.S. Pat. No. 4,898,910.

A composition according to the invention comprises finely divided filler. Among the preferred filler materials are the commercially available precipitated and ground calcium carbonates (which may include minor proportions of, for example, magnesium carbonate) and mixtures thereof. These fillers may be surface treated by stearic acid, or not. Preferred materials are those which contain about 0.4 to about 3.0% by weight stearate. The commercially available precipitated calcium carbonates generally are crystalline and have a substantially uniform particle size such that their surface area is of the order of about 20 m$^2$/g whereas the commonly used commercially available ground calcium carbonates may be crystalline or amorphous materials each grade of which contains a fairly wide spread of particle sizes and is composed principally of particles having a surface area in the range of about 1 to 2 m$^2$/g, although other particle size materials are available. We prefer to employ a mixture of 10 to 80% by weight of the mixture of a calcium carbonate composed principally of particles having a surface area of 10 to 30 m$^2$/g and 20 to 90% by weight of the mixture of a calcium carbonate composed principally of particles having a surface area of 0.5 to 12 m$^2$/g. We prefer to employ the precipitated materials to provide the calcium carbonate having a surface area from 10 m$^2$/g to 30 m$^2$/g and to employ the ground materials to provide the calcium carbonate composed principally of particles having a surface area from 0.5 m$^2$/g to 12 m$^2$/g. The filler comprising a mixture of calcium carbonates is preferably present to an extent of from 100 to 250 parts by weight per 100 parts by weight of the hydroxypolysiloxane. Those compositions which employ a major proportion of the precipitated calcium carbonate tend to be less flowable than those which employ a larger proportion of the much coarser ground calcium carbonate. The precipitated calcium carbonate is preferably employed in proportions of at least 10% and preferably at least 20% by weight and less than 80%, preferably not more than about 60% to 70% by weight of the mixed filler. The ground calcium carbonate may be employed in proportions of 20% to 90% of the mixed fillers and may provide at least 60% by weight of the mixed filler. A preferred filler is present in an amount of 150 to 250 parts by weight per 100 parts by weight of the hydroxypolysiloxane and comprises a mixture of (i) a calcium carbonate composed principally of particles having a surface area of 20 m$^2$/g and (ii) a calcium carbonate composed principally of particles having a surface area of 1 to 2 m$^2$/g, in a ratio of from 1 to 3 parts by weight of (i) per part of (ii).

The calcium carbonate fillers aforesaid are preferably used as the sole filler. Additional fillers, for example ferric oxide, diatomaceous earth, alumina, hydrated alumina, titanium oxide, glass microballoons, organic fillers or resins, crushed quartz, calcium sulphate, oxides, hydroxides carbonates or bicarbonates of calcium, magnesium, barium or zinc, barium sulphate and fumed silicas, or mixtures thereof, may be included but care is required to ensure the desired blend of properties is not adversely influenced.

Catalysts which may be employed in a composition according to the present invention for promoting crosslinking of the hydroxypolysiloxane include the known tin and titanium compound catalysts. Suitable tin compounds include tin salts of carboxylic acids and particularly the stannous salts of the more commonly available carboxylic acids. Examples of suitable materials are dibutyl tin dilaurate, stannous acetate, stannous napthenate, stannous benzoate, stannous sebacate, stannous succinate and stannous octoate. Suitable titanium compounds include certain alkyl titanates and alkyltitanium complexes, for example tetraisobutyl titanate, tetraisopropyl titanate and di(isopropyl)-di(ethylacetoacetate) titanate.

A composition according to the invention contains a rheological additive which comprises a polymer having attached to the polymer chain at least one carboxylic acid anhydride group. Without wishing to be bound by any particular theory, we believe the polymer interacts with the filler as by chemical reaction or hydrogen bonding to influence the flow properties associated with the filler. The polymer may have two or more anhydride groups per polymer chain and is preferably a mixture having an average of about 1 to 7 anhydride groups per polymer chain. The polymer chosen is fluid or capable of being rendered effectively fluid e.g. by solution in organic solvent at the temperature at which the composition is prepared. Preferably the polymer is a liquid at room temperature and preferably has a viscosity in the range 1,000 to 30,000 mm$^2$/s. Any desired polymer chain may be used which does not adversely influence properties of the composition. Polymers having an anhydride group as a terminal, chain or pendant group may be employed. It is desirable to ensure that the polymer employed is compatible with the other ingredients of the composition so that it does not tend to separate from the composition after it is cured. In proportions of less than 10 parts by weight per 100 parts by weight of the hydroxypolysiloxane the polymers produced from polybutadiene or polystyrene are suitable for use in the invention as are polymers produced from polysiloxanes. Polymers made by "functionalising" a polybutadiene with maleic acid anhydride or by copolymerisation of styrene and maleic anhydride acid are commercially available and suitable for use in the present invention. We prefer to employ a polybutadiene polymer which has been treated with a carboxylic acid anhydride and has a molecular weight in the range 1,000 to 6,000, a viscosity in the range 1500 to 20,000 mm$^2$/s, an acid number (mg KOH/g) in the range 50 to 200 and an average of between 1.2 and 5 anhydride groups per molecule. The preferred polymer may be employed in proportions of 0.5 to 5 parts by weight per 100 parts by weight of the filler. We prefer to employ from about 0.75 to about 2.5 parts by weight of the rheological additive polymer per 100 parts by weight of the hydroxypolysiloxane.

A composition according to the present invention may, and preferably does, comprise a modulus lowering additive capable of co-operating with the rheological additive to enhance the desired flow characteristics. Suitable modulus lowering additives include, for example, salts of sulphonic acids of the formula $RSO_3H$ in which R represents a hydrocarbon group which may be halogenated or not and may consist of or comprise an aliphatic chain of up to about 20 carbon atoms, for example alkyl or alkylaryl sulphonic acids according to the general formula $RSO_3H$ where R is a monovalent hydrocarbon unit containing 6 to 18 carbon atoms or $R'C_6H_4$ where $R'$ is an alkyl group containing 6 to 18 carbon atoms. A preferred acid is dodecylbenzene sulphonic acid, DBSA. We prefer to employ from 0.6 to 0.9 parts by weight of the acid by weight of the hydroxypolysiloxane.

A composition according to the present invention may contain a liquid plasticiser or extender. One may employ, for example, a non-reactive silicone fluid or gum, for example a trialkylsilyl endblocked polydiorganosiloxane, or an organic diluent. The trialkylsilyl end-blocked polydimethylsiloxanes are preferred, especially those having a viscosity in the range of about 100 mm$^2$/s to about 15,000 mm$^2$/s. These materials are effective in reducing modulus at 100% elongation and also contribute to ability of the composition to adhere to concrete. However, in view of their tendency to exude from the composition over long periods of time we prefer to employ them only in those cases where this exudation is acceptable. In such cases we prefer to employ the trialkylsilyl endblocked polydimethylsiloxanes to provide up to about 70 parts by weight more preferably less than 50 by weight per 100 parts by weight of the hydroxypolysiloxane.

A composition according to the invention may also comprise other additives frequently employed in silicone sealants, for example pigments, antioxidants and adhesion promoters, for example hydrolysable amino silanes, for example gamma-amino-propyl-trimethoxysilane, N-gamma-aminoethyl-aminopropyl-triethoxysilane and glycidoxypropyltrimethoxysilane.

A composition according to the invention, which may be a one or two part composition, may be prepared by mixing the ingredients together in any desired order. For example, preferred one part, moisture curable compositions may be made by dispersing the mixed filler composition in the hydroxypolysiloxane, or by adding the fillers separately to the hydroxypolysiloxane, and then adding the catalyst and the curing agent. It is necessary to remove excess water from the mixture before the curing agent is added, although minor excess amounts may be scavenged during storage by use of suitable quantities of hydrolysable silanes. The rheological additive can be incorporated at any stage of the formulation process with the same effect on the rheology of the system. However, in a preferred formulation the anhydride functionalised additive is added after the filler dispersion into the polysiloxane. Pigments and minor additives may be added to the mixture at any desired stage, and this is preferably done as near the end of the mixing procedure as possible. The composition may then be charged into cartridges and left to age for 7 days or more at room temperature before use.

A composition according to the invention may be formulated which has a desired blend of properties which render it suitable for use as a sealant for filling building joints, and also for making insulating glazing units, glazing, expansion joints, or as a general purpose sealant. A particular benefit is the possibility to formulate a composition which demonstrates ease of extrusion from a cartridge nozzle and thixotropy in the joint prior to curing as well as good adhesion to various substrates.

In particular when modulus lowering additives such as DBSA are present in the formulation, one may provide a moisture curable calcium carbonate filled silicone sealant with low modulus and with improved rheological properties in which the "body" of the composition prior to curing is found to be similar to that obtained with silica containing compositions.

In order that the invention may become more clear there follows a number of example compositions selected to illustrate the present invention. Unless the context otherwise requires all parts are by weight.

The following tests were performed on the example compositions. Extrusion Rate was determined as the weight of sealant extruded during 1 minute at 6.2 bar from a standardised semco cartridge with a 2 mm diameter nozzle at 25° C.; penetration was measured using a standard penetrometer (PNR10-SVR) with a 3 g pin needle. The penetration is expressed in millimetres during 30 seconds. Modulus at 100% elongation, Tensile Strength and Elongation were measured using a tensometer by pulling 2 mm sheet samples at a constant rate to the point of rupture and by calculating the appropriate values. Adhesion to Glass was measured by applying a sealant bead on the substrate and testing it according to the following sequence: cure 7 dRT-test-2 dRT water immersion—test—2 d underwater at 50° C. test. The test consists of pulling the bead away from the interface at an angle of 90 degrees after having initiated the failure by cutting the joint at the sealant/substrate interface with a razor blade. After each test a rating is given to a 'sample' depending on the type of failure recorded for each bead: 0=interfacial failure, 1=boundary failure, 2=cohesive failure. The final rating is the average rating obtained for all the three tests of the sequence.

EXAMPLE 1

A composition, useful as a sealant with good adhesion was prepared comprising 100 parts of OH-terminated dimethyl polysiloxane of viscosity 50,000 mm$^2$/s at 25° C., 41 parts of trimethylsilyl endblocked dimethylpolysiloxane of viscosity 100 mm$^2$/s at 25° C., 184 parts of a filler mixture comprising 106 parts of calcium carbonate having a surface area of 20 m$^2$/g and 78 parts of calcium carbonate having a surface area of 1 to 2 m$^2$/g (both stearate coated respectively by 3 and 0.4%), 7 parts of Methyltrimethoxysilane as curing agent, 1.8 parts of di-(isopropyl)di(ethylacetoacetate) titanate as catalyst, 0.19 part of N-gamma-aminoethyl α-aminopropyl-trimethoxysilane as adhesion promoter and 0.9 part of DBSA. A second composition was prepared from the same materials in the same proportions and to this composition was added 1.0 part of an anhydride functionalised polybutadiene, Molecular weight 2160, acid No. 70 mg KOH/g and 1.35 anhydride groups per chain. The first composition exhibited the following properties; Extrusion Rate (6.2 bar) 320 g/min, Penetration 220 mm/30 s, Tensile Strength 1.67 MPa/s, Elongation 688%, Modulus at 100% 0.39 MPa and Adhesion to Glass 2.00. These results compare with 230, 140, 1.61, 673, 0.40 and 2.00 respectively for the second composition containing the anhydride functionalised polybutadiene.

EXAMPLE 2

A composition was prepared comprising 100 parts of OH-terminated dimethylpolysiloxane of viscosity 50,000 mm$^2$/s at 25° C., 39 parts of trimethylsilyl endblocked dimethylpolysiloxane of viscosity 100 mm$^2$/s at 25° C., 161 parts of a filler mixture comprising 92 of calcium carbonate having a surface area of 20 m$^2$/g and 69 parts of calcium carbonate having a surface area of 1 to 2 m$^2$/g (both stearate coated respectively by 3 and 0.4%), 6.25 parts of methyltrimethoxysilane as curing agent, 1.6 parts of di(isopropyl)-di(ethylacetoacetate)-titanate as catalyst, 0.16 part of N-gamma-aminoethyl-aminopropyl-trimethoxysilane as adhesion promoter and 0.75 part of DBSA. A second composition was prepared from the same materials in the same proportions and to this composition was added 0.8 parts of the anhydride functionalised polybutadiene. The first composition exhibited the following properties; Extrusion Rate (6.2 bar) 360 g/min, Penetration 220 mm/30 s, Tensile Strength 1.50 MPa, Elongation 510%, Stress at 100% 0.30 MPa and Adhesion to Glass 2.00. These results compare with 220, 150, 1.67, 560, 0.30 and 2.00 respectively for the composition containing the anhydride functionalised polybutadiene.

EXAMPLE 3

Two compositions were prepared comprising 100 parts of OH-terminated dimethylpolysiloxane of viscosity 50,000 mm$^2$/s at 25° C., 44 parts of trimethylsilyl endblocked dimethyl polysiloxane of viscosity 100 at 25° C., 184 parts of a filler mixture comprising 106 parts of calcium carbonate having a surface area of 20 m$^2$/g and 78 parts of calcium carbonate having 1 to 2 m$^2$/g (both stearate coated respectively by 3 and 0.4%), 7 parts of methyltrimethoxysilane as curing agent, 1.8 parts of di(isopropyl)-di (ethylacetoacetate)titanate as catalyst, 0.18 part of N-gamma-aminoethyl-aminopropyl-trimethoxysilane as adhesion promoter and 0.6 part of DBSA. The first composition additionally contained 1.0 part of the anhydride functionalised polybutadiene and the second contained 1.5 parts of the anhydride functionalised polybutdiene. The first composition exhibited the following properties; Extrusion Rate (6.2 bar) 220 g/min, Penetration 120 mm30 s, Tensile Strength 1.59 MPa, Elongation 687%, Stress at 100% 0.34 MPa, and Adhesion to Glass 2.00. These results compare with 180, 104, 1.81, 752, 0.35 and 2.00 respectively for the second composition.

Examples 1 to 3 reveal the effect of the anhydride functionalised polybutadiene at different levels of concentration on the rheology of silicone sealant compositions.

EXAMPLE 4

A composition was prepared comprising 100 parts of OH-terminated dimethylpolysiloxane of viscosity 50,000 mm$^2$/s at 25° C., 28 parts of a trimethylsilyl endblocked dimethylpolysiloxane of viscosity 100 mm$^2$/s at 25° C., 127 parts of Calcium Carbonate having a surface area of 20 m$^2$/g (stearate coated by 3%), 7 to 8 parts of methyltris(methylethylketoximino)silane, 0.4 part of dimethoxymethyl(methylethylketoximino)silane, 2 parts of methoxymethylbis(methylethylketoximino)silane, all three silanes being used as crosslinker, 2.55 parts of gamma-aminopropyltrimethoxysilane as adhesion promoter and 0.085 part of dibutyltindilaurate as catalyst.

A second composition was prepared from the same materials in the same proportions and to this composition was added 2.5 parts of the anhydride functionalised polybutudiene. The first composition had an extrusion rate (6.2 bar) of 116 g/min and a penetration of 128 mm30 s versus 72 and 103 respectively when the anhydride functionalised additive was used.

EXAMPLE 5

A composition comprising 100 parts of OH-terminated dimethylpolysiloxane of viscosity 50,000 mm$^2$/s at 25° C., 20 parts of trimethylsilyl endblocked dimethylpolysiloxane of viscosity 100 mm$^2$/s at 25° C., 125 parts of a filler mixture comprising 80 parts of calcium carbonate having a surface area of 20 m$^2$/g and 45 parts of calcium carbonate having a surface area of 1 to 2 m$^2$/g (both stearate coated respectively by 3 and 0.4%), 8.0 parts of methyltrimethoxysilane as curing agent, 2.0 parts of di(isopropyl)-di(ethylacetoacetate)-titanate as catalyst and 0.2 part of N-gamma-aminoethyl-aminopropyl-trimethoxysilane as adhesion promoter, had an Extrusion Rate (6.2 bar) 400 g/min, Tensile Strength 1.90 MPa, Elongation 464%, Stress at 100% 0.71 MPa and Adhesion to Glass 2.00. A second composition additionally comprising 0.65 part of DBSA had an Extrusion Rate (6.2 bar) 390 g/min, Tensile Strength 1.70 MPa, Elongation 600%, Stress at 100% 0.42 MPa and Adhesion to Glass 2.00. A third composition additionally comprising 0.65 part of DBSA and 1.0 part of the anhydride functionalised polybutadiene had an Extrusion Rate (6.2 bar) 330 g/min, Tensile Strength 1.79 MPa, Elongation 610% Stress at 100% 0.42 MPa and Adhesion to Glass 2.00.

Example 5 illustrates the specific role played by the two additives used in our formulation. In particular it shows that DBSA mainly acts on the modulus (decrease) while the anhydride functionalised polybutadiene increases the viscosity as seen by a drop in the extrusion rate of the composition containing this additive.

EXAMPLE 6

A composition was prepared comprising 100 parts of OH-terminated dimethyl polysiloxane of viscosity 50,000 mm$^2$/s at 25° C., 39 parts of trimethylsilyl endblocked dimethylpolysiloxane of viscosity 100 mm$^2$/s at 25° C., 161 parts of a filler mixture comprising 92 parts of calcium carbonate having a surface area of 20 m$^2$/g and 69 parts of calcium carbonate having a surface area of 1 to 2 m$^2$/g (both stearate coated respectively by 3 and 0.4%), 7 parts of methyltrimethoxysilane as curing agent, 1.6 parts of di(isopropyl)-di(ethylacetoacetate)-titanate as catalyst, 0.16 part of N-gamma-aminoethyl-aminopropyl-trimethoxysilane as adhesion promoter, 0.75 part of DBSA and 1.0 part of an additive selected from the anhydride functionalised polybutadiene, a carboxylic acid functionalised polybutadiene (Hycar 200/162 from Goodrich), an unfunctionalised polybutene (AMOCO H1500), and a hydroxyl functionalised polybutadiene (Sartomer R45-HT from Sartomer). The composition containing the anhydride functionalised polybutadiene had an extrusion rate (6.2 bar) 220 g/min versus 280 when the carboxylic acid functionalised polybutadiene was used, 320 when the unfunctionalised polybutene was used and 280 when the hydroxyl functionalised polybutadiene was used.

EXAMPLE 7

A composition was prepared comprising 100 parts of OH-terminated dimethyl polysiloxane of viscosity 50,000 mm$^2$/s at 25° C., 39 parts of trimethylsilyl endblocked dimethylpolysiloxane of viscosity 100 mm$^2$/s at 25° C., 161 parts of a filler mixture comprising 92 parts of calcium carbonate having a surface area of 20 m$^2$/g and 69 parts of calcium carbonate having 1 to 2 m$^2$/g (both stearate coated respectively by 3 and 0.4%), 7 parts of methyltrimethoxysilane as curing agent, 1.6 parts of di(isopropyl)-di (ethylacetoacetate)titanate as catalyst, 0.16 part of N-gamma-aminoethyl-aminopropyl-trimethoxysilane as adhesion promoter, 0.75 part of DBSA and 2.0 parts of an additive selected from a carboxylic acid functionalised polybutadiene (Hycar 200/162 from Goodrich) and a carboxylic acid functionalised polyester (Dynacol 8221 from Huels). The composition containing the carboxylic acid functionalised polybutadiene had an Extrusion Rate (6.2 bar) 280 g/min compared with 285 g/min when the carboxylic acid functionalised polyester was used.

It is apparent from Examples 6 and 7 above that the anhydride functional polymers are more efficient than carboxylic acid functional molecules at equivalent carboxyl group content in the composition. However, the use of the hydroxyl functional molecule is not desirable and may have a negative effect on the sealant. The polymer backbone has no special function and it is believed that any backbone is suitable for this purpose.

That which is claimed is:

1. A curable composition comprising the product formed by mixing a hydroxypolysiloxane with a silane or siloxane curing agent therefor, finely divided filler, a catalyst for promoting curing of the product in presence of moisture of the atmosphere and a rheological additive comprising a polymer having in or on its polymer chain at least one carboxylic acid anhydride group.

2. A composition according to claim 1 wherein the rheological additive is a liquid or low melting point solid at normal working temperature.

3. A composition according to claim 1 wherein the rheological additive comprises a polybutadiene polymer which has been treated with a carboxylic acid anhydride and has a viscosity in the range 1,500 to 20,000 mm$^2$/s, an acid number (mg KOH/g) in the range 50 to 200 and an average of between 1 and 7 anhydride groups per molecule.

4. A composition according to claim 3 wherein the carboxylic acid anhydride is maleic acid anhydride.

5. A composition according to claim 1 wherein the filler comprises precipitated and/or ground calcium carbonate.

6. A composition according to claim 1 wherein the filler is present to an extent of 150 to 250 parts by weight per 100 parts by weight of the hydroxypolysiloxane and comprises a mixture of (i) a calcium carbonate composed principally of particles having a surface area of 20 m$^2$/g and (ii) a calcium carbonate composed principally of particles having a surface area of 1 to 2 m$^2$/g, in a ratio of from 1 to 3 parts by weight of (i) per part of (ii).

7. A composition according to claim 1 wherein the product is formed by mixing the said ingredients and an alkyl or an arylalkyl sulphonic acid, of the general formula RSO$_3$H where R represents R'C$_6$H$_4$ in which R' is an alkyl group containing 6 to 18 carbon atoms.

8. A composition according to claim 1 wherein the hydroxypolysiloxane comprises a dihydroxypolysiloxane of the general formula HO(R$_2$SiO)$_x$H wherein R represents a monovalent hydrocarbon group having up to 12 carbon atoms, x is an integer such that the polymer has a viscosity in the range 50 to 500,000 mm$^2$/s.

9. A composition according to claim 1 wherein the curing agent comprises methyltrimethoxysilane.

10. A composition according to claim 1 wherein the product is formed by mixing the said ingredients and up to 25% by weight of the composition of a trialkylsilyl endblocked polydimethylsiloxane having a viscosity in the range 100 mm$^2$/s to 15,000 mm$^2$/s.

* * * * *